(12) United States Patent
Yang et al.

(10) Patent No.: US 9,277,181 B2
(45) Date of Patent: Mar. 1, 2016

(54) MEDIA SERVICE PRESENTATION METHOD AND COMMUNICATION SYSTEM AND RELATED DEVICE

(75) Inventors: Jian Yang, Shenzhen (CN); Guoqiao Chen, Shenzhen (CN); Lei Wang, Shenzhen (CN); Huiping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1110 days.

(21) Appl. No.: 12/647,360

(22) Filed: Dec. 24, 2009

(65) Prior Publication Data

US 2010/0100818 A1 Apr. 22, 2010

Related U.S. Application Data

(63) Continuation of application No. PCT/CN2008/071753, filed on Jul. 25, 2008.

(30) Foreign Application Priority Data

Aug. 2, 2007 (CN) .......................... 2007 1 0138033

(51) Int. Cl.
*G06F 3/00* (2006.01)
*H04N 7/16* (2011.01)
(Continued)

(52) U.S. Cl.
CPC .......... *H04N 7/163* (2013.01); *G06F 17/30056* (2013.01); *H04N 21/431* (2013.01); *H04N 21/4622* (2013.01); *H04N 21/4722* (2013.01); *H04N 21/8543* (2013.01)

(58) Field of Classification Search
USPC ....................................................... 715/760
See application file for complete search history.

(56) References Cited

U.S. PATENT DOCUMENTS 7,827,579 B2 * 11/2010 Saarikivi .............. H04N 5/4401
725/50
8,935,420 B2 * 1/2015 Bouazizi ................ H04H 20/28
709/231

(Continued)

FOREIGN PATENT DOCUMENTS

CN 1765101 A 4/2006
CN 1863206 A 11/2006

(Continued)

OTHER PUBLICATIONS

Bill Evjen et al., "Professional XML," Wrox, Apr. 9, 2007, chapter 3, section 1.*

(Continued)

*Primary Examiner* — Matt Kim
*Assistant Examiner* — Maryam Ipakchi
(74) *Attorney, Agent, or Firm* — Conley Rose, P.C.; Grant Rodolph; Nicholas K. Beaulieu

(57) ABSTRACT

A media service presentation method, communication system and related device are provided, in which the media service presentation method comprises: obtaining the media presentation information; presenting media services to a user according to the service presentation information. By obtaining the media service presentation information, the media services are presented to the user according to the service presentation information. In this way, the scene SVG-based description is not necessarily needed, which in turn simplifies the terminal's computing process, improving the terminal's performance, and improving user experience.

26 Claims, 10 Drawing Sheets

(51) Int. Cl.
*G06F 17/30* (2006.01)
*H04N 21/431* (2011.01)
*H04N 21/462* (2011.01)
*H04N 21/4722* (2011.01)
*H04N 21/8543* (2011.01)

(56) References Cited

U.S. PATENT DOCUMENTS

| | | | |
|---|---|---|---|
| 2005/0151756 A1 | 7/2005 | Miyamoto | |
| 2006/0053450 A1* | 3/2006 | Saarikivi | H04N 21/8402 725/46 |
| 2006/0235925 A1* | 10/2006 | Rossotto | G06F 17/30017 709/203 |
| 2007/0072543 A1* | 3/2007 | Paila | H04H 20/38 455/3.06 |
| 2007/0107013 A1 | 5/2007 | Seppala et al. | |
| 2007/0174415 A1 | 7/2007 | Cha et al. | |
| 2008/0270449 A1* | 10/2008 | Gossweiler | G06F 17/30817 |
| 2009/0089535 A1 | 4/2009 | Lohmar et al. | |
| 2009/0144771 A1 | 6/2009 | Bangma et al. | |
| 2009/0228876 A1 | 9/2009 | Chen | |

FOREIGN PATENT DOCUMENTS

| | | |
|---|---|---|
| CN | 1926893 A | 3/2007 |
| CN | 101359996 B | 4/2012 |
| EP | 1562344 A1 | 8/2005 |
| JP | 2005198204 A | 7/2005 |
| JP | 2005222401 A | 8/2005 |
| JP | 2006-524368 | 10/2006 |
| JP | 2009-515386 | 4/2009 |
| JP | 2009516943 A | 4/2009 |
| JP | 2009135926 A | 6/2009 |
| JP | 2009522921 A | 6/2009 |
| JP | 2010531512 A | 9/2010 |
| KR | 20070035472 A | 10/2007 |
| WO | WO 2004/095794 A1 | 11/2004 |
| WO | WO2004/095794 A1 | 11/2004 |
| WO | WO 2005/109826 A1 | 11/2005 |
| WO | WO 2007/029099 A1 | 3/2007 |
| WO | WO2007/052111 A1 | 5/2007 |
| WO | WO 2007/078252 A2 | 7/2007 |
| WO | WO 2007/080500 A1 | 7/2007 |

OTHER PUBLICATIONS

T. Paila et al., "FLUTE—File Delivery over Unidirectional Transport," Oct. 2004.*
Wikipedia.com, "Laptop," Jun. 2006.*
Wikipedia.com, "Data compression," Dec. 2006.*
Yamada, A "Scenario" and its Processing System for Content and Service Cooperation, IPSJ SIG Technical Reports, Aug. 28, 2003.
Notice of Reasons for Rejections in JP Application No. 2010-516356, dated Oct. 18, 2011.
Office Action issued in Korean patent Application No. 10-2009-7026837, dated Feb. 7, 2011.
Written Opinion of the International Searching Authority (translation) dated (mailed) Oct. 30, 2008, issued in related Application No. PCT/CN2008071753, filed Jul. 25, 2008, Huawei Technologies Co., Ltd.
First Chinese Office Action dated (mailed) Aug. 12, 2010, issued in related Chinese Application No. 200710138033.2 Huawei Technologies C., LTD.
European Patent Office Communication related to the extended report, pursuant to Rule 62 EPC, the supplementary European search report (Art. 153(7) EPC) and the European search opinion, related to Application No. 08783746.4-1527, dated (mailed) Jun. 8, 2012, Huawei Tech Co., Ltd (7 pgs.).
Memo Title: MPEG; Source: Systems; Status: Proposal; Editors: Cyril Concolato (ENST); International Organization for Standardization Coding of Moving Pictures and Audio; ISO/IEC JTC 1/SC 29/WG 11; N7507; Jul. 2005, Poznan (2 pgs.).
EXWAY launches turnkey FastESG solution for mobile TV; EXPWAY Marketing XML Efficient Press Release; Paris, Aug. 23, 2005 (3 pgs.).
Digital Video Broadcasting: IP Datacast over DVB-H: Electronics Service Guide (ESG); DVB Document A099; Nov. 2005 (89 pgs).
Japanese Office Action (Translation) regarding Application No. 2010-516356; Notice of Reasons for Rejection; mailed May 29, 2012 (8 pgs.).

* cited by examiner

US 9,277,181 B2

MEDIA SERVICE PRESENTATION METHOD AND COMMUNICATION SYSTEM AND RELATED DEVICE

CROSS-REFERENCE TO RELATED APPLICATIONS

This application is a continuation of International Application No. PCT/CN2008/071753, filed on Jul. 25, 2008, which claims priority to Chinese Patent Application No. 200710138033.2, filed on Aug. 2, 2007, both of which are hereby incorporated by reference in their entirety.

FIELD OF THE INVENTION

This invention relates to the communications field, and in particular, to a media service presentation method and communication system and related device.

BACKGROUND

A method of multimedia mobile service presentation in the prior art is usually implemented in a rich media environment (RME). Moreover, the lightweight application scene representation (LASeR) technology is widely used in practical RMEs. The previous technical solutions are briefly described as follows.

LASeR employs a scene description language in binary format to encode a 2D scene and describe an updated scene. This binary language and its SVG-T-based design for scene description are applicable for some portable devices, such as mobile phone. Furthermore, the LASeR usually works with the simple aggregation format (SAF).

As a capsulation format, the SAF packs LASeR scene data and audio-video content for transmission over a data stream protocol. The SAF can meet all the requirements of RME services for media description scenes and interfaces with existing transfer protocols.

A media service presentation method of the prior art comprises:

Step 1: Scene descriptions and media streams are delivered to a terminal through SAF capsulation.

The scene description employs a scalable vector graphics (SVG) language to write the format of scene description, uses some extended commands of LASeR, performs the binary encoding process, and then implements SAF encapsulation and sends it to a terminal.

Step 2: Scene description data and media data are resolved after the terminal has received SAF packets, and then the binary scene description in an extensible markup language (XML) format is presented.

However, the prior art describes scenes in the SVG language, which is mainly adopted for processing pictures. As a result, the terminal incurs heavy resolution to obtain scene description data and media data, thus degrading the terminal's performance and user experience.

SUMMARY

A media service presentation method and communication system and related device are provided in an embodiment of the present invention to improve user experience.

A media service presentation method is provided in an embodiment of the present invention. The method comprises:
  obtaining media service presentation information; and
  presenting the media service to user according to service presentation information.

A communication system is provided in an embodiment of the present invention. The system comprises:
  a service guide (SG) server, adapted to: deliver an XML document containing SG information;
  a presentation server, adapted to: deliver presentation template information; and
  a terminal, adapted to: generate presentation script information according to presentation template information from the presentation server and SG information from the SG server, and present script information to the user.

A terminal is provided in an embodiment of the present invention. This terminal comprises:
  an obtaining unit, adapted to: obtain SG information, presentation template information, and media content;
  a script generating unit, adapted to: generate script information according to presentation template information and SG information obtained by the obtaining unit; and
  a presentation unit, adapted to: present media content to the user through presentation script information produced by the script generating unit.

A terminal is provided in an embodiment of the present invention. This terminal comprises:
  a network communication unit, adapted to: communicate with a server over the preset data transmission protocol;
  an SG engine, adapted to: obtain and maintain SG information through the network communication unit; and
  an application unit for multimedia presentation, adapted to: present SG information obtained and maintained by an SG engine to user.

The previous technical solutions indicate that embodiments of the present invention have the following advantages:

By obtaining media service presentation information, media services are presented to a user according to service presentation information. In this way, SVG-based scene description is not necessarily needed. The present invention helps to simplify terminal's computing, improve terminal's performance, and improve user experience.

DETAILED DESCRIPTION

A media service presentation method and communication system and related devices that can improve user experience is provided in an embodiment of the present invention.

In an embodiment of the present invention, a terminal is provided to obtain related information and program data, including an SG, the terminal presents the received SG content to the user, the user browses SG content presented by the terminal, and selects mobile multimedia services, and the terminal presents corresponding media content according to a user's selection.

The present invention eliminates the need for any SG-based scene description, thus simplifying the terminal's computing process, improving the terminal's performance, and improving user experience.

Figure 1:
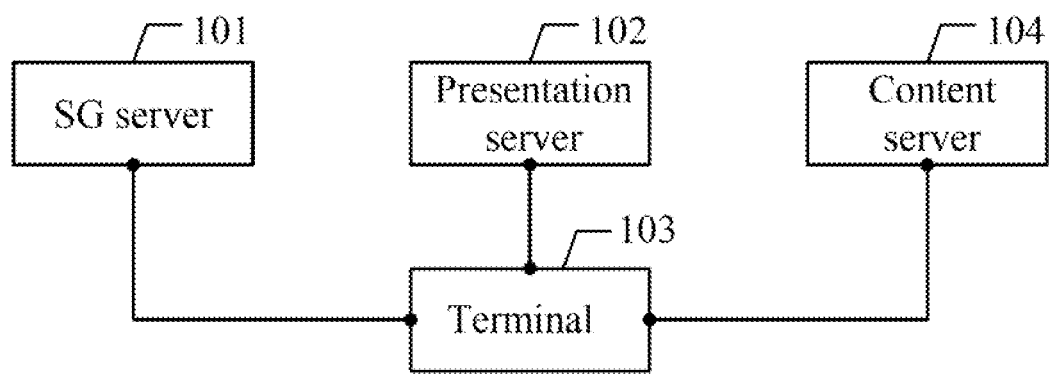
FIG. 1 shows a first embodiment of communication system in the present invention.

The communication system is illustrated in the following embodiment of the present invention, as shown in FIG. 1. The first embodiment of communication system in the present invention comprises:

an SG server 101, adapted to: deliver an XML document containing SG information;

a presentation server 102, adapted to: deliver presentation template information;

a terminal 103, adapted to: generate script information according to the received presentation template information and SG information, and present the presentation script information to the user; and a content server 104, adapted to: deliver the media content to terminal 103.

In this embodiment, the media content obtained by terminal 103 is transferred from the content server 104. Therefore, it is understandable that media content is directly preset in the terminal 103 without the content server 104 in practical implementation.

Figure 2:
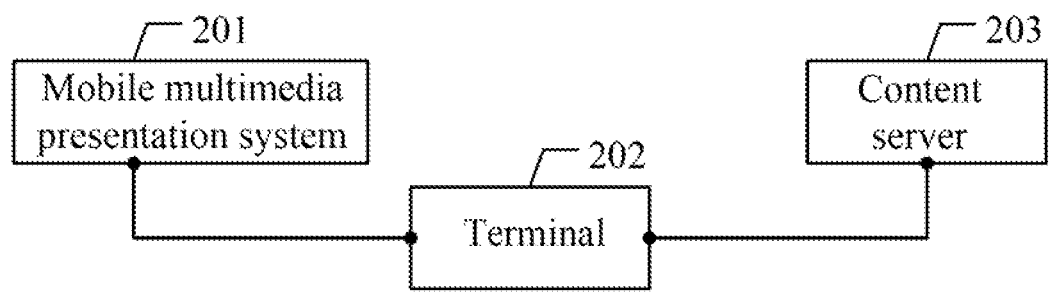
FIG. 2 shows a second embodiment of communication system in the present invention.

In practical applications, an independent server is not responsible for performing every function, and the servers can be logically or physically integrated according to their roles, as shown in FIG. 2. The second embodiment of communication system in the present invention comprises:

a mobile multimedia presentation system 201, adapted to: obtain SG information and presentation template information, generate presentation script information according to the received presentation template information and SG information, and deliver the presentation file containing the presentation script information;

a terminal 202, adapted to: generate script information according to the received presentation file, and present the presentation script information to a user; and a content server 203, adapted to: deliver the media content to a terminal.

In this embodiment, the media content obtained by terminal 202 is transferred from the content server 203. Therefore, it is understandable that media content is directly preset in the terminal 202 without the content server 203 in practical applications.

This embodiment is implemented by integrating functions of the SG server and the presentation server from the first embodiment of communication system into the mobile multimedia presentation system 201.

Figure 3:
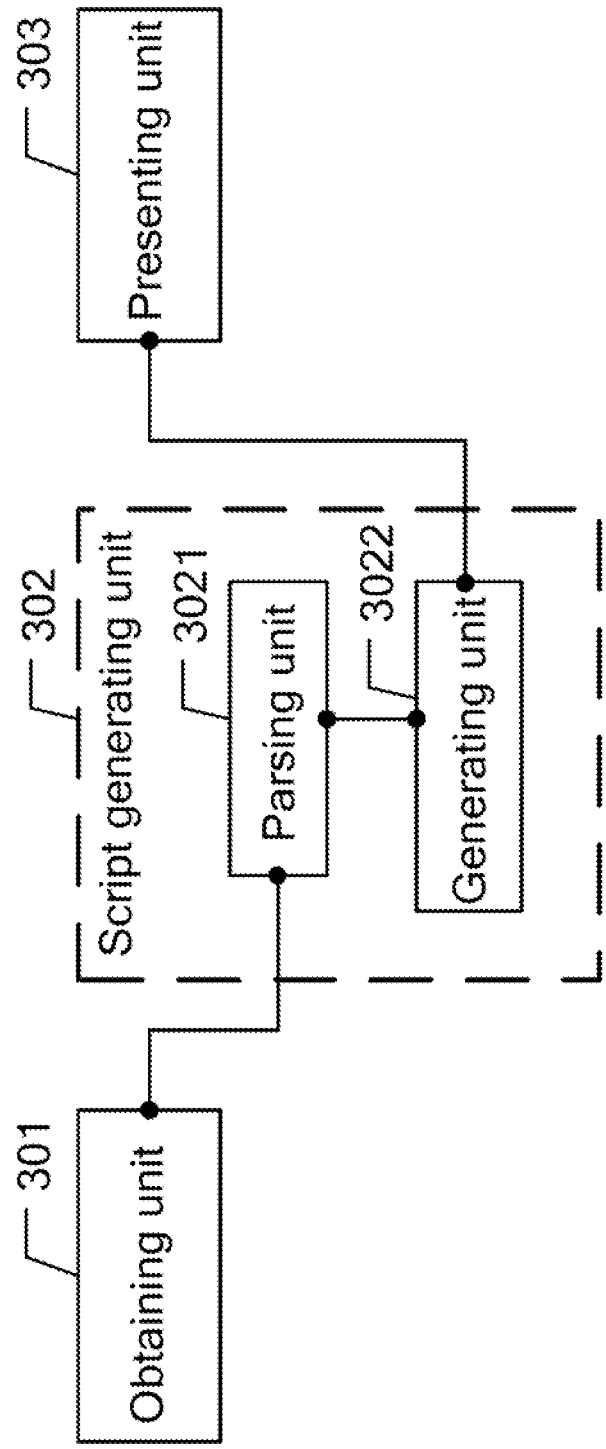
FIG. 3 shows a first embodiment of terminal in an embodiment of the present invention.

The terminal finally presents media information to the user. The embodiments of the server are detailed in an embodiment of the present invention, as shown in FIG. 3. The first embodiment of terminal in an embodiment of the present invention comprises:

an obtaining unit 301, adapted to: obtain SG information, presentation template information, and media content;

a script generating unit 302, adapted to: generate presentation script information according to presentation template information and SG information; and a presentation unit 303, adapted to: present media content through presentation script information to user.

Figure 4:
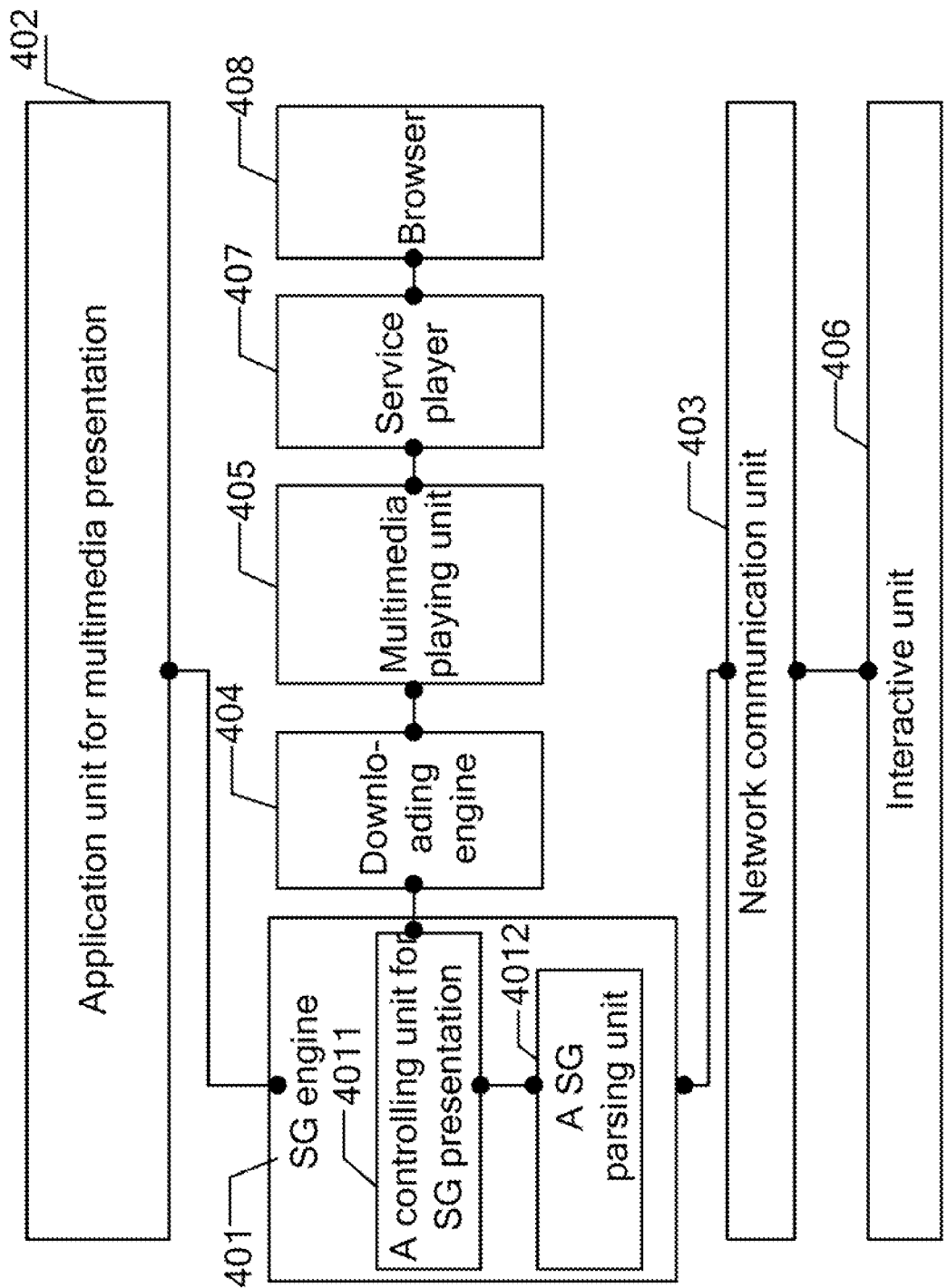
FIG. 4 shows a second embodiment of terminal in an embodiment of the present invention.

The script generating unit 302 comprises:

a resolving unit 3021, adapted to: resolve SG information into SG data; and a generating unit 3022, adapted to: convert SG data into presentation script information according to presentation template information;

See FIG. 4. The second embodiment of terminal in an embodiment of the present invention comprises:

an SG engine 401, adapted to: obtain and maintain SG information;

an application unit for multimedia presentation 402, adapted to: present SG information to the user;

a network communication unit 403, adapted to: communicate with a server according to the preset data transmission protocol;

a downloading engine 404, adapted to: download the media content requested by the user;

a multimedia play unit 405, adapted to: play the downloaded media content for the user;

an interaction unit 406, adapted to: deliver interaction information between the terminal and the server when the media content is being played;

a service player 407, adapted to: play presentation script file for user, where the presentation script file are in the format of a player format; and a browser 408, adapted to: play presentation script file for user, and the presentation script file suits browser's format.

The SG engine 401 comprises:

an SG resolving unit 4011, adapted to: resolve the received SG information into SG data; and a controlling unit for the SG presentation 4012, adapted to: control the application unit for multimedia presentation 402 to present the SG for the user.

In this embodiment, by employing an SG engine 401, an application unit for multimedia presentation 402, and a network communication unit 403, the terminal shows SG information to a user. However, the user needs a downloading engine 404 and a multimedia play unit 405 to download and play the multimedia content. For communication with the server, the user further needs an interaction unit 406.

Figure 5:
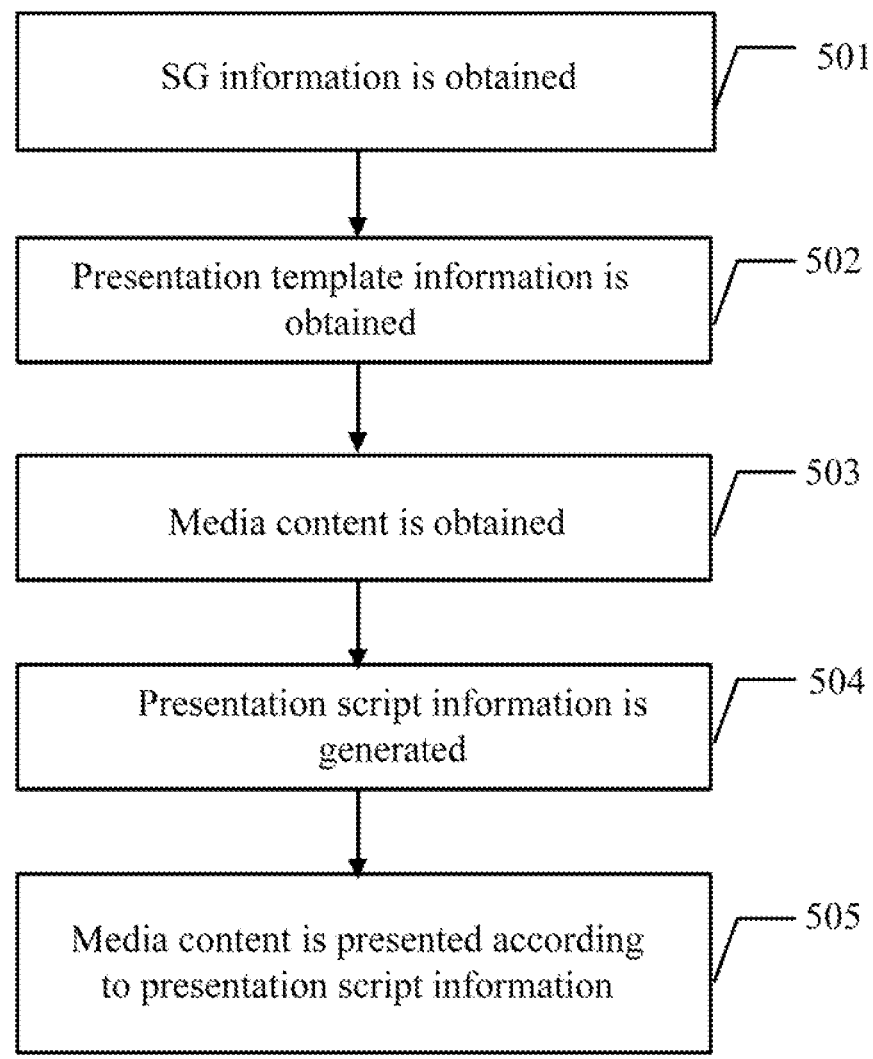
FIG. 5 shows media service presentation method in an overall embodiment of the present invention.

The media presentation method is detailed in the following embodiments of the present invention, as shown in FIG. 5. A flowchart of media presentation method in an embodiment of the present invention comprises:

Step 501: SG information is obtained.
Step 502: Presentation template information is obtained.
Step 503: Media content is obtained.
Step 504: Presentation script information is generated according to SG information and presentation template information.
Step 505: Media content is presented according to presentation script information.

In this embodiment, specific methods for obtaining information are not limited to the sequence of steps 501, 502, and 503. The following embodiment will detail the sequence of these three steps.

Step 501 and step 503 are optional. That is, the methods for obtaining SG and media content are not limited to the present embodiment, and steps 501 and 503 are implemented according to conditions.

The media service presentation method in the embodiment of the present invention can be divided into three categories:

1. A player-based media presentation mode is elaborated hereinafter.

Figure 6:
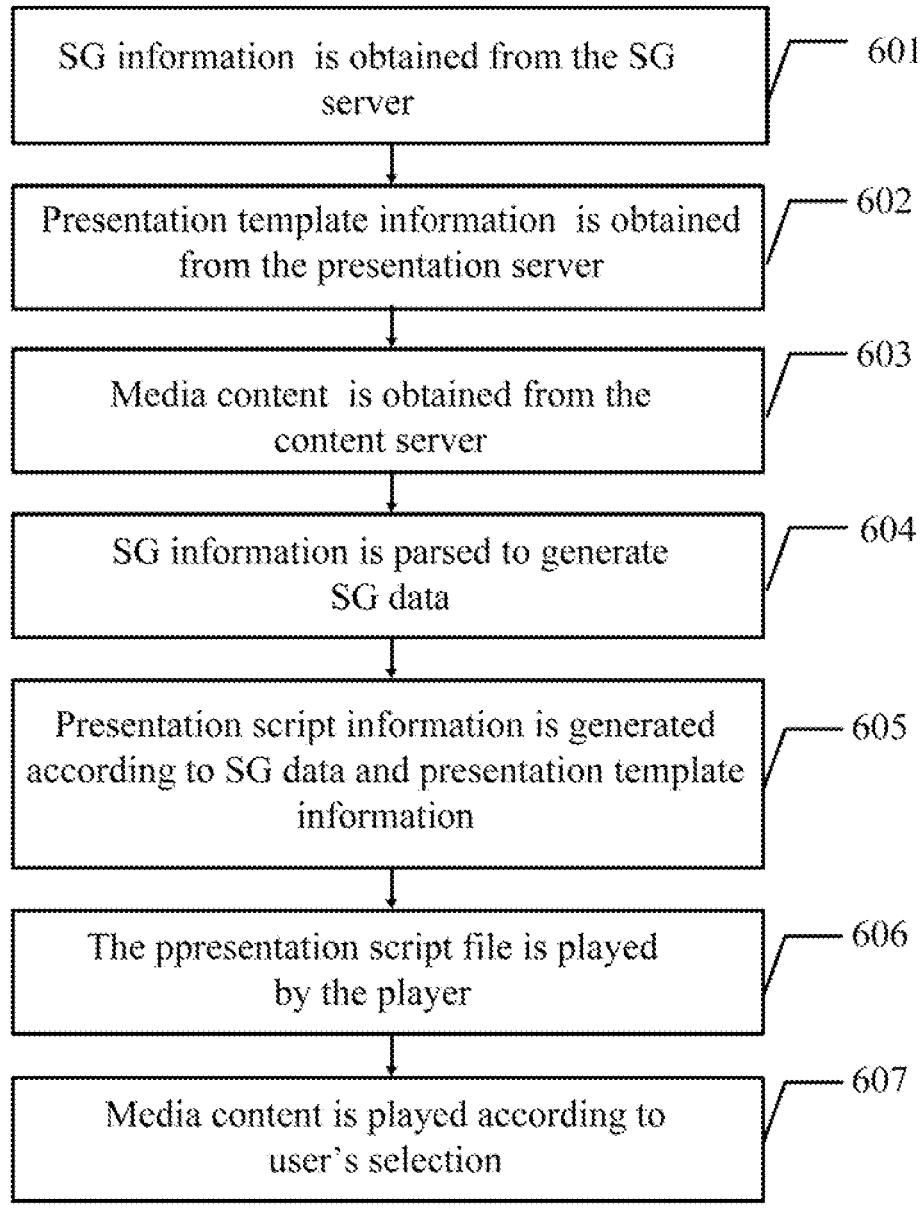
FIG. 6 shows a first embodiment for media service presentation method in an embodiment of the present invention.

See FIG. 6. The first embodiment of media service presentation method in an embodiment of the present invention comprises:

Step 601: SG information is obtained from an SG server.

In this embodiment, SG information is sent in two modes: broadcasting and interactive.

Searching the SG in broadcasting mode: A public address carrying an SG bootstrap session enables the terminal to find SG's access information from different operators. A terminal finds SG's assert session according to the access information and obtains SG's transmission descriptors transferred in an assert session. For example, the descriptor can find entry address of a FLUTE session and further obtain content from SG information.

Sending the SG in broadcasting mode: The SG transfer unit transmits data within one or more FLUTE sessions to send SGs in broadcasting mode.

An interactive path also can obtain complete SG information, and assists the terminal in searching and obtaining part of the required SG information.

Interactive SGs are discovered in two ways:

1. Searching an interactive network for SG's entry information

A terminal user visits a known SG portal through an interactive network and chooses to visit and download favorite SG information.

2. Searching a broadcasting network for interactive SG's information

A terminal user receives bootstrap sessions from a broadcast network. If a service navigation supplier provides an interactive SG, the terminal user can obtain entry information of interactive SG from a bootstrap session, and visit and download the SG through the portal.

Interactive SGs are transferred and obtained through the following way: The terminal requests the queried content of the SG server through HTTP Get or HTTP POST. After receiving the request, the SG supplier returns corresponding SG data in the load through HTTP response. Through one exchange, the terminal can obtain all or part of SG information, such as information about a channel or program.

Step 602: Presentation template information is obtained from a presentation server.

In this embodiment, presentation template information is obtained from a presentation server. Therefore, it is understandable that presentation template information is preset in a terminal if no presentation server is installed.

With a presentation server, presentation template information can be obtained through unicast or multicast:

1. Unicast

Push mechanism: SMIL, SVG or Flash Lite implementations require a presentation server to deliver presentation template information to a terminal. As presentation template information is unicast uni-directionally, the Push method is used to directly transfer information to the terminal. While using the Push method, the terminal will deliver necessary presentation template information according to its capacity.

Content delivery mechanism includes dynamic content delivery (DCD). The DCD defines a content delivery mechanism, which is designed to periodically deliver subscriber's content.

Internet protocols include hyper text transport protocol (HTTP). In addition to passively obtaining related presentation template information through Push mechanism, the terminal also uses the Push mechanism to obtain related presentation template information through Internet protocols, such as HTTP or session initialization protocol (SIP). While obtaining presentation template information, the Pull mechanism also fetches the related content as needed. Therefore, the media service presentation method in an embodiment of the present invention helps to reduce network data transmission traffic and increase efficiency.

Message mechanisms include MMS, SMS or IM. In addition to the mechanisms discussed earlier, a message mechanism can also carry presentation template information.

2. Multicast

This method is divided into two categories: transfer of all mobile multimedia services, that is, transfer through the access layer of mobile multimedia service; and other types of transfer independent of the access layer, that is, file transfer through IP multicast technologies, such as FLUTE.

Specifically, multicast through access layer of mobile multimedia service comprises some technologies ranging from DVB-H, MBMS to BCMCS.

Multicast independent of access layer is implemented through the FLUTE technology.

Step 603: Media content is obtained from a content server.

In this embodiment, the media content is obtained from a content server. In practical applications, it is understandable that the content media is directly preset in a terminal without any content server.

Step 604: SG information is resolved to generate SG data. Further, the received SG information is resolved to generate SG data.

Step 605: Presentation script information is generated according to SG data and presentation template information.

In this embodiment, the obtained SG data is filled into the corresponding location according to rules relating to presentation template information to generate presentation script information, which is used to present SMIL, SVG; or Flash Lite.

In this embodiment, presentation template information can be either a rule file or any other files. For improved feasibility, presentation template information can be organized to suit the XML Schema or XML DTD forms of SMIL, which characterizes an XML file. The terminal generates an accurate SMIL script file according to SMIL script's XML Schema or DTD after the terminal has read the SG data.

Step 606: A presentation script file is played by the player.

In this embodiment, by using a player, the terminal shows to the user the media content, which is the presentation script file in the format of the generated in step 605.

Step 607: Media content is played according to user's selection.

As described in step 606, the mobile multimedia service content, which is played on a player, mainly relates to SG's content. When a user is clicking mobile multimedia content, the terminal calls a corresponding player to play media content, such as video content. This method is implemented in the following two ways:

1. Calling a video player by a script player. When a user clicks in the corresponding area of a player for presentation multimedia service, and the call time of video player is activated, the terminal's software system will run a corresponding video player and suspend the script player.

2. Embedding a video player in the script player. The script player will run simultaneously if a presentation interface is embedded with a video player. While watching a video, the terminal user can also browse other information.

In this embodiment, the SG server, presentation server, and content server are isolated from each other. It is understandable that the independent server is not responsible for performing every function, and the servers can be logically or physically integrated according to their roles. For example, an SG server and a presentation server can be integrated into a mobile multimedia presentation system.

The mobile multimedia presentation system obtains SG information and presentation template information, and resolves SG information to generate SG data. The obtained SG data is filled into the corresponding location according to rules relating to presentation template information to generate presentation script information, which is used to display SMIL, SVG, or Flash Lite.

After generating presentation script information, the mobile multimedia presentation system adds presentation script information to a presentation file, and transfer the file, which can be compressed before delivery, to a terminal;

Specifically, presentation files can be either unicast or multicast/broadcast:

Presentation files can be unicast through the following technologies:

Push, including general Push technology and SIP Push technology;

internet protocols, such as HTTP;

technologies such as MMS and IM; and

RTP/RTCP technologies of PSS (Streaming).

Presentation files can be multicast through the following technologies:

media stream/FLUTE of the DVB-H technology;

media stream/FLUTE of the MBMS technology;

media stream/FLUTE of the BCMCS technology; and

IP-based FLUTE technology.

After receiving a presentation file, the terminal compresses the file and restores the original presentation script file for the player's presentation. Take a SMIL method for example. The SMIL script file is restored for the SMIL player after compression. The terminal transfers the restored script file to the corresponding media player.

After receiving a presentation script file relating to corresponding mobile multimedia service, a media player plays the media content and shows the related content of mobile multimedia service to the user.

The procedure of playing media content is omitted here as it is the same as step 607.

In this embodiment, a user can also communicate with a server as follows:

sending, by the terminal, a request for interaction when the media content is presented;

selecting interaction information to be activated, and editing interaction information as required by the terminal;

sending the finished interaction information to the server;

returning, by the server, an interaction response to the terminal; and presenting this media content to the user according to the interaction response.

The methods for obtaining SG and media content are not limited to this embodiment and can be implemented according to conditions.

In this embodiment, the presentation file is compressed before delivery to reduce the amount of data transmission and improve network performance.

In addition, the interaction between the user and the server in this embodiment helps to improve user experience.

II. A browser-based media presentation mode is elaborated hereinafter.

Figure 7:
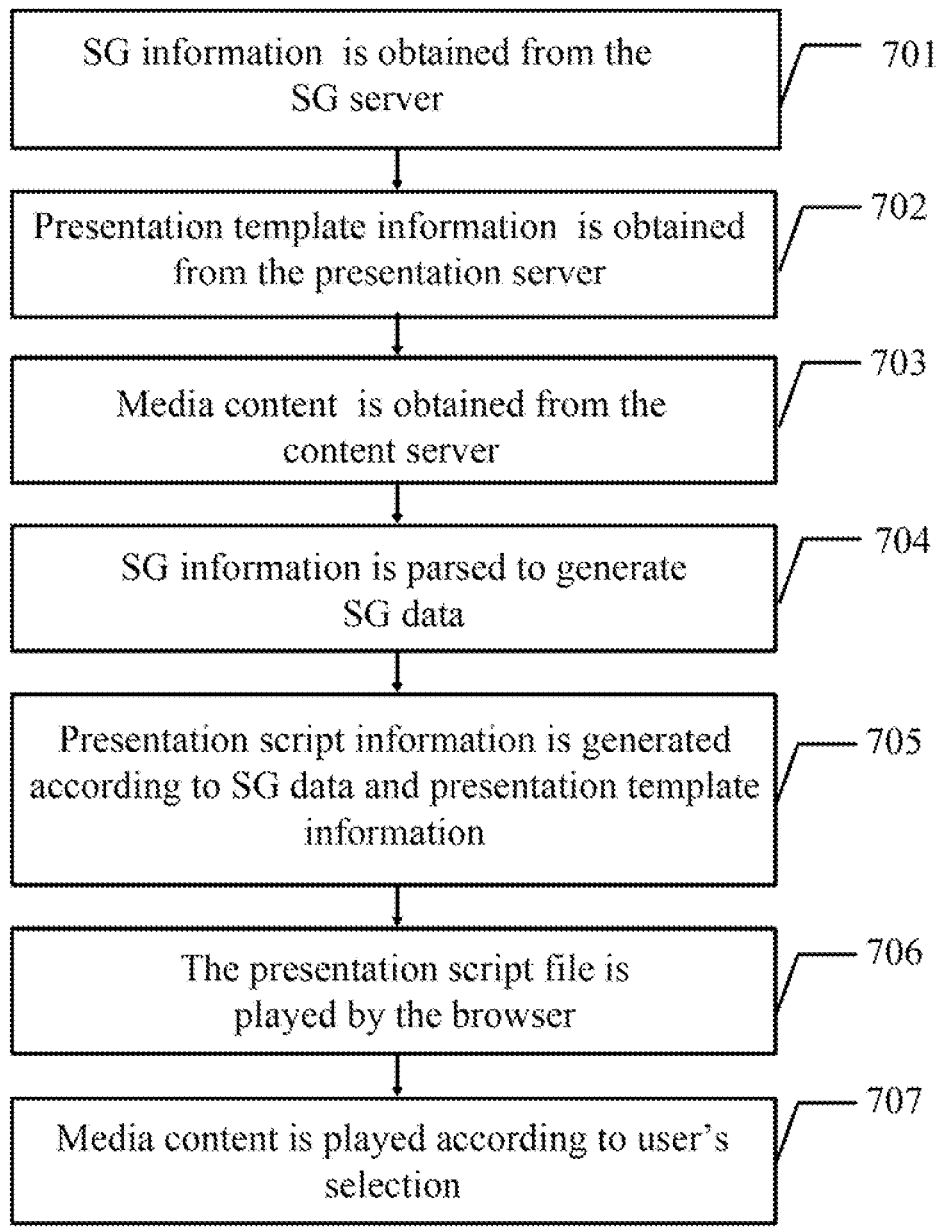
FIG. 7 shows a first embodiment for the media service presentation method in an embodiment of the present invention.

See FIG. 7. The second embodiment of media service presentation method in an embodiment of the present invention comprises:

Step 701: SG information is obtained from an SG server;

In this embodiment, SG information is transmitted in two ways: broadcasting and interaction.

Searching the SG in broadcasting mode: A public address carrying an SG bootstrap session enables a terminal to find SG's access information from different operators. The terminal finds an SG assert session according to this information and obtains SG's transmission descriptors through the session. For example, the descriptor can find the entry address of FLUTE and further obtain the content of SG information.

Sending the SG in broadcasting mode: The SG transfer unit transmits information within one or more FLUTE sessions to broadcast SGs.

An interactive path can obtain complete SG information and also assist the terminal in searching and obtaining part of the required SG information.

Interactive SGs are discovered in the following two ways:

1. Searching SG's entry information from an interactive network

A terminal user visits a known SG portal through an interactive network and chooses to visit and download favorite SG information.

2. Searching a broadcasting network for interactive SG's information

The terminal receives a bootstrap session from the broadcast network. If the service navigation supplier provides an interactive SG, a terminal user can obtain entry information relating to an interactive SG through the bootstrap session, and then visit and download SGs from the portal.

The interactive SGs are transferred and obtained in the following way: The terminal requests the content of the SG server through HTTP Get or HTTP POST. After receiving the request, the SG supplier returns corresponding SG data in the load through HTTP response. The terminal can obtain all or part of the SG information through one interaction, including information relating to a channel or program.

Step 702: Presentation template information is obtained from a presentation server.

In this embodiment, presentation template information is obtained from a presentation server. Therefore, it is understandable that presentation template information is preset in a terminal if no presentation server is installed.

With a presentation server, presentation template information is obtained through unicast or multicast:

1. Unicast

Push mechanism: The implementations of HTML and XHTML require a presentation server to deliver presentation template information to a terminal. As presentation template information is delivered uni-directionally through unicast, the Push method is used to directly transfer information to a terminal. Given the Push method, the terminal is adapted to deliver necessary presentation template information according to the terminal's capacity.

Content delivery mechanism includes dynamic content delivery (DCD). The DCD defines a content delivery mechanism, which is designed to periodically deliver subscriber's content.

Internet protocols include a hyper text transport protocol (HTTP). In addition to passively obtaining related presentation template information through Push mechanism, the terminal also uses the Push mechanism to obtain related presentation template information through Internet protocols, such as HTTP or session initialization protocol (SIP). While obtaining presentation template information, the Pull mechanism also fetches the related content as needed. Therefore, the media service presentation method in an embodiment of the present invention helps to reduce network data transmission traffic and increase efficiency.

Message mechanisms include MMS, SMS or IM. In addition to the mechanisms discussed earlier, a message mechanism can also carry presentation template information.

2. Multicast

This method is divided into two categories: transfer of all mobile multimedia services, that is, transfer through the access layer of mobile multimedia service; and other types of transfer independent of the access layer, that is, file transfer through IP multicast technologies, such as FLUTE.

Specifically, multicast through access layer of mobile multimedia service comprises some technologies ranging from DVB-H, MBMS to BCMCS.

Multicast independent of access layer is implemented through the FLUTE technology.

Step 703: Media content is obtained from a content server.

In this embodiment, the media content is obtained from a content server. In practical applications, it is understandable that the content media is directly preset in a terminal without any content server.

Step 704: SG information is resolved to generate SG data.

Further, the received SG information is resolved to generate the SG data.

Step 705: Presentation script information is generated according to SG data and presentation template information.

In this embodiment, the obtained SG data is filled into corresponding location according to rules relating to presentation template information to generate presentation script information, which is used to present HTML's presentation script information.

In this embodiment, presentation template information can be either a rule file or any other files.

Step 706: The presentation script file is played by a browser.

In this embodiment, by using a browser, the terminal shows to the user the media content, which is the presentation script file in the format of the browser generated in step 705.

Step 707: Media content is played according to user's selection.

As described in step 706, the mobile multimedia service content, which is played through a browser, mainly relates to SG's content. When a user clicks mobile multimedia content, the terminal calls the corresponding player to play media content, such as video. This process is completed in two ways:

1. Calling a video player by Web browser. After the user clicks in the corresponding area of Web browser for presentation of multimedia service is clicked, and activates the call time of video player, the terminal software system will run the corresponding video player and suspend the Web browser.

2. Embedding a video player into a Web browser. The Web browser runs simultaneously if a presentation interface is embedded with a video player. While watching the video content, a terminal user can also browse other information.

In addition to playing video content, these previous methods are also used to play some other content.

In this embodiment, the SG server, presentation server, and content server are isolated from each other. It is understandable that an independent server is not responsible for performing every function, and the servers can be logically or physically integrated according to their roles, for example, an SG server and a presentation server can be integrated into a mobile multimedia presentation system.

Therefore, the mobile multimedia presentation system obtains SG information and presentation template information, and resolves SG information to generate SG data. The obtained SG data is filled into the corresponding location according to rules relating to presentation template information to generate presentation script information, which is used to display SMIL, SVG, or Flash Lite.

After generating presentation script information, the mobile multimedia presentation system adds information to presentation file and transfer the file to terminal, which can be compressed before delivery.

Specifically, the transmission of presentation file can be divided into unicast and multicast/broadcast modes:

A unicast mode for transferring presentation file employs the following technologies:

Push, including general Push technology and SIP Push technology;

internet protocols, such as HTTP;

technologies such as MMS and IM; and

RTP/RTCP technology of PSS (Streaming).

A multicast mode for transferring presentation file employs the following technologies:

Media stream/FLUTE of the DVB-H technology;

media stream/FLUTE of the MBMS technology;

media stream/FLUTE of the BCMCS technology; and

IP-based FLUTE technology.

After receiving a presentation file, the terminal compresses the file and restores the original presentation script file for player. For example, as for the SMIL mode, a SMIL script file is restored for SMIL player after compression. The terminal transfers the restored script file to corresponding media player.

After receiving the presentation script file of corresponding mobile multimedia service, the media player plays the content and presents the user with the related content of mobile multimedia service.

The process for playing media content is omitted as it is the same with the one in step 707.

In this embodiment, the user can also communicate with a server as follows:

commencing, by the terminal, a request for interaction while presenting media content;

selecting interaction information to be activated, and editing the interaction information as required by the terminal;

sending the finished interaction information to server;

returning an interaction response to terminal by server; and presenting the corresponding media content to user according to the interaction response.

The modes for obtaining SG and media content are not limited to this embodiment and can be implemented according to conditions.

In this embodiment, a presentation file is compressed before delivery to reduce the amount of data transmission and improve network's performance.

In addition, an interaction between user and server in this embodiment helps to improve user experience.

III. A media presentation mode based on a local application is elaborated hereinafter.

According to different capacities of a terminal, the present solution is divided into three categories:

A. The first category refers to performing SG's browser functions.

Figure 8:
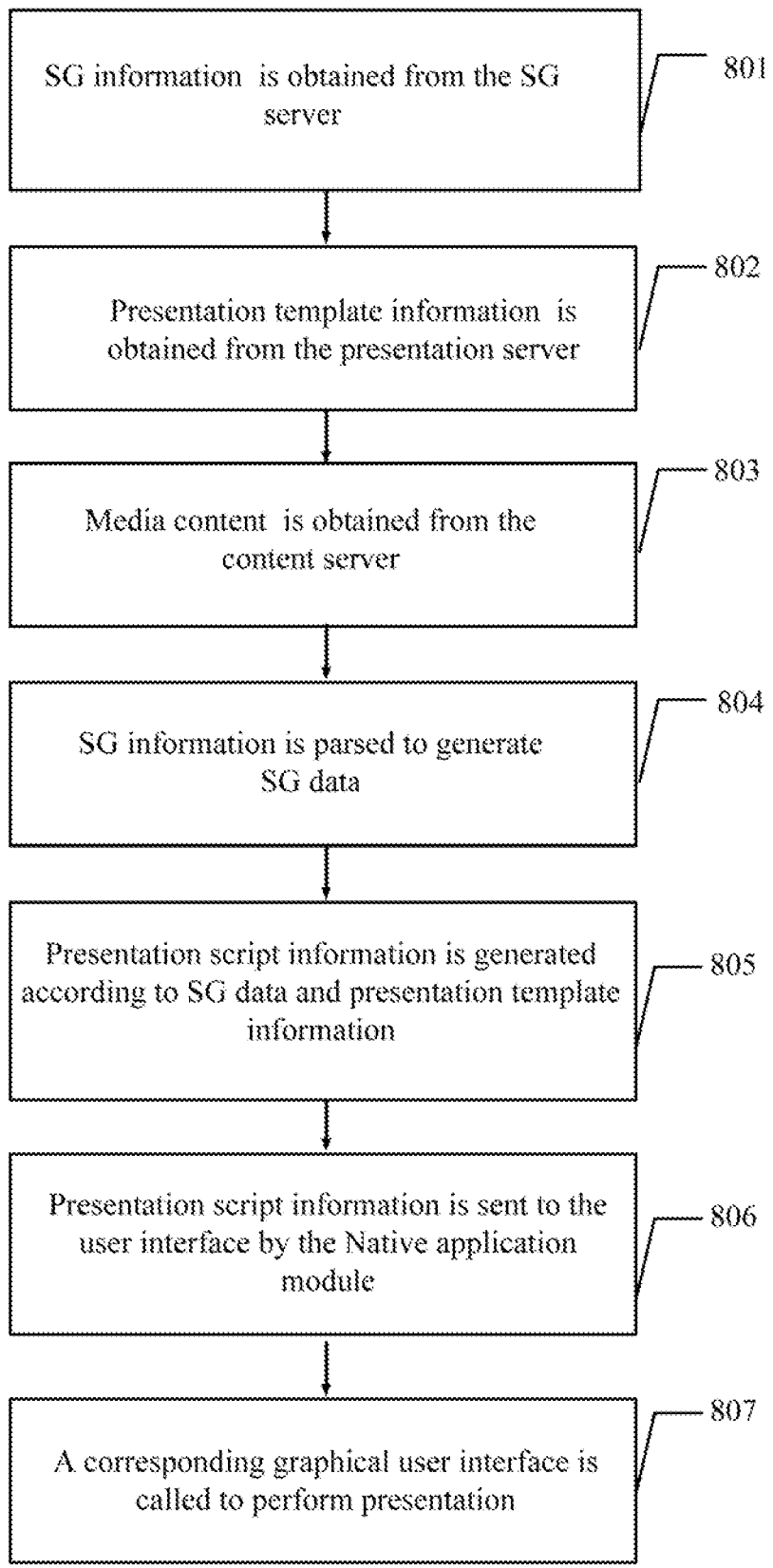
FIG. 8 shows a first embodiment of media service presentation method in an embodiment of the present invention.

See FIG. 8. The third embodiment of media service presentation method in an embodiment of the present invention comprises:

Step 801: SG information is obtained from an SG server.

In this embodiment, SG information is transmitted in two ways: broadcasting and interaction.

Searching the SG in broadcasting mode: A public address carrying an SG bootstrap session enables a terminal to find SG's access information from different operators. The terminal finds an SG assert session according to this information and obtains the SG transmission descriptor through the session. For example, the descriptor can find entry address of FLUTE and further obtain the content of SG information.

Sending the SG in broadcasting mode: SG transfer unit transmits information within one or more FLUTE sessions to broadcast SGs.

An interactive path can obtain complete SG information and also assist the terminal in searching and obtaining part of the required SG information.

Two modes are employed to search SG by an interactive mode:

1. Searching SG's entry information from an interactive network

A terminal user visits a known SG portal through an interactive network and chooses to visit and download favorite SG information.

2. Searching interactive SG's information through a broadcasting network

A terminal user receives a bootstrap session from the broadcast network. If the service navigation supplier provides an interactive SG, a terminal user can obtain the entry information relating to interactive SG through a bootstrap session, and visit and download SGs from the portal.

Interactive SGs are transferred and obtained in the following way: The terminal sends the request for searching the content to the SG server through the HTTP Get or HTTP POST: after receiving the request, the SG supplier returns the corresponding SG data in the load through HTTP response. The terminal obtains all or part of the SG information through one interaction, including information relating to a channel or program.

Step 802: Presentation template information is obtained from a presentation server.

In this embodiment, presentation template information is obtained from a presentation server. Therefore, it is understandable that presentation template information is preset in a terminal if no presentation server is installed.

The presentation server adopts text or figures to illustrate the styles of presentation server. For instance, some digit numbers, such as '1'. '2', or '3', are used to define the style for a local terminal. Presentation template information is obtained in the following ways if a presentation server is available:

Push mechanism;

content delivery mechanism includes dynamic content delivery (DCD);

internet protocols, such as HTTP; and message mechanisms, such as MMS, SMS or IM.

Step 803: Media content is obtained from a content server.

In this embodiment, the media contained is obtained by a content server. Therefore, it is understandable that the content media is directly preset in a terminal without any content server in the practical application.

Step 804: SG information is resolved to generate SG data. Further, the received SG information is resolved to generate the SG data.

Step 805: Presentation script information is generated according to SG data and presentation template information.

In this embodiment, the obtained SG data is filled into corresponding location according to rules relating to presentation template information to generate presentation script information, which is used to present the HTML.

In this embodiment, presentation template information can be either a rule file or any other files.

Step 806: Presentation script information is sent to a user interface through the Native application module.

Step 807: A corresponding GUI is called for presentation.

In this embodiment, the SG server, presentation server, and content server are isolated from each other. It is understandable that an independent server is not responsible for performing every function, and the servers can be logically or physically integrated according to their roles. For example, an SG server and a presentation server can be integrated into a mobile multimedia presentation system.

The implementation of this embodiment is omitted as it is similar to the previous embodiment.

In this embodiment, data is presented on a terminal by utilizing local terminal capabilities, defining unified UIs, and using the data obtained from the server. A UI must be customized and special client software based on terminal capabilities must be developed before this solution is implemented.

Specifically, software structure is divided into network access, SG client, and MMI layers. SG's XML file is delivered from the network server to the terminal in FLUTE or HTTP mode. After receiving SG information, the terminal starts to resolve SG information.

After processing SG data and presentation template information, the terminal delivers presentation script data to the SG player and calls corresponding GUI for presentation through MMI.

The methods for obtaining SG and media content are not limited to this embodiment and can be implemented according to conditions.

B. The second category refers to implementing SG's functions for browsing and playing media content.

Figure 9:
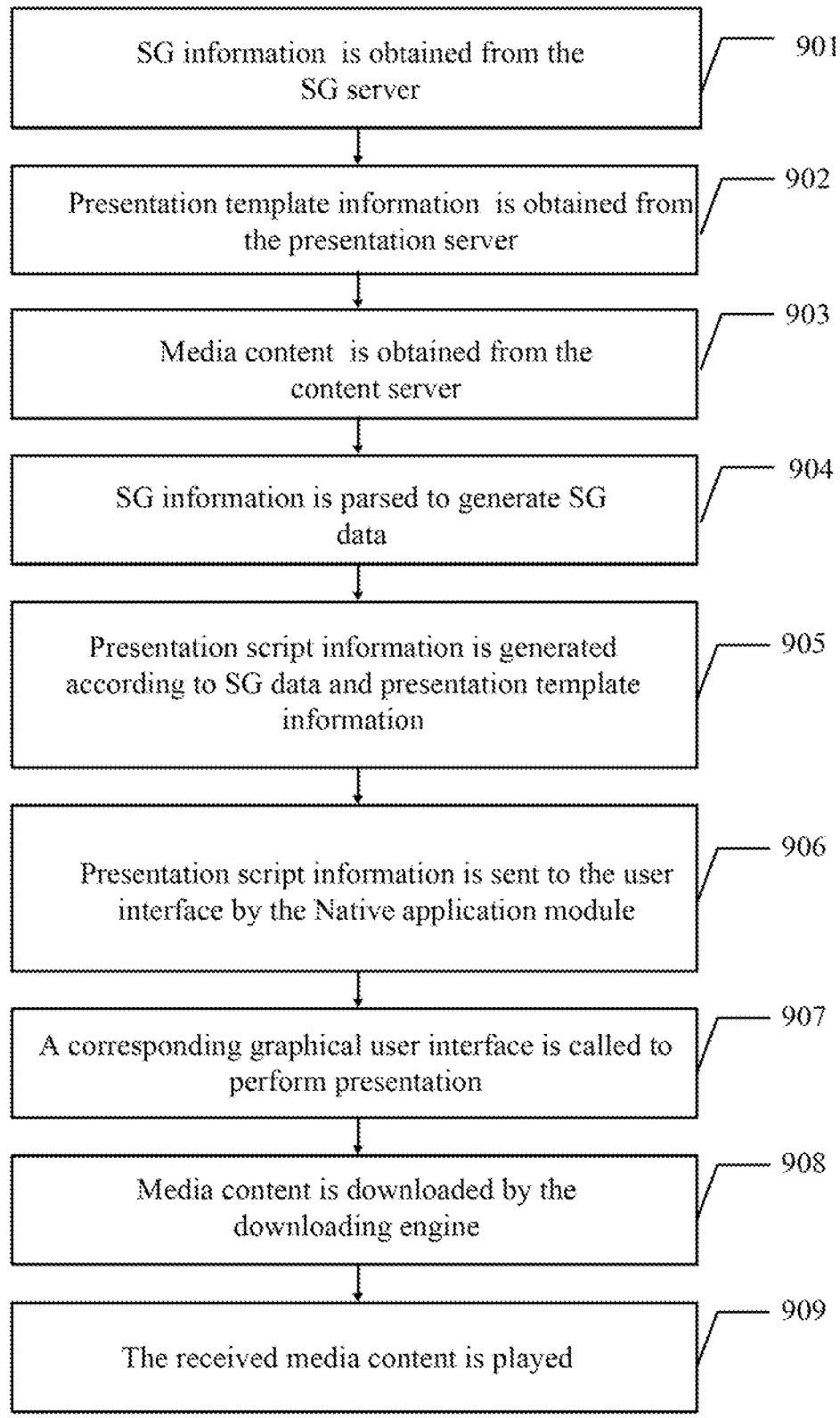
FIG. 9 shows a first embodiment of media service presentation method in an embodiment of the present invention.

See FIG. 9. The fourth embodiment of media service presentation method in an embodiment of the present invention comprises:

901: SG information is obtained from an SG server.

In this embodiment, SG information is transmitted in two ways: broadcasting and interaction.

Searching the SG in broadcasting mode: A public address carrying an SG bootstrap session enables a terminal to find SG's access information from different operators. The terminal finds SG assert session according to this information and obtains SG transmission descriptors through an assert session. For example, a descriptor can find an entry address of FLUTE and further obtain the content of SG information.

Sending the SG in broadcasting mode: The SG transfer unit transmits information within one or more FLUTE sessions to broadcast SGs.

An interactive path can obtain complete SG information and also assist the terminal in searching and obtaining part of the required SG information.

The searching of interactive SG is divided into two ways:

1. Searching SG's entry information from an interactive network

A terminal user visits a known SG portal through an interactive network and chooses to visit and download favorite SG information.

2. Searching interactive SG's information through a broadcasting network

A terminal user receives a bootstrap session from the broadcast network. If the service navigation supplier provides an interactive SG, the terminal user obtains entry information relating to interactive SG through a bootstrap session, visits and downloads the SG through the portal.

Interactive SGs are transferred and obtained in the following way: The terminal sends a request for searching content to an SG server through HTTP Get or HTTP POST. After receiving the request, the SG supplier returns corresponding SG data in the load through HTTP response. The terminal can obtain all or part of the SG information through one interaction, including information relating to a channel or program.

Step 902: Presentation template information is obtained from a presentation server.

In this embodiment, presentation template information is obtained from a presentation server. Therefore, it is understandable that presentation template information is preset in a terminal if no presentation server is installed.

The presentation server adopts text or figures to illustrate the styles of presentation server. For instance, some digit numbers, such as '1', '2', or '3', are used to define a style for the local terminal.

Presentation template information is obtained by the following ways if a presentation server is available:

Push mechanism;

content delivery mechanism includes dynamic content delivery (DCD);

internet protocols, such as HTTP; and message mechanisms, such as MMS, SMS or IM.

Step 903: Media content is obtained from a content server.

In this embodiment, the media content is obtained by a content server. Therefore, it is understandable that the content media is directly preset in a terminal without any content server in the practical application.

Step 904: SG information is resolved to generate SG data. Further, the received SG information is resolved to generate the SG data.

Step 905: Presentation script information is generated according to SG data and presentation template information.

In this embodiment, the obtained SG data is filled into corresponding location according to rules relating to presentation template information to generate presentation script information, which is used to present the HTML.

In this embodiment, presentation template information can be either a rule file or any other files.

Step 906: Presentation script information is sent to a user interface through the Native application module.

Step 907: A corresponding GUI is called for presentation.

Step 908: The media content is downloaded through a downloading engine.

Step 909. The received media content is played.

In this embodiment, the SG server, presentation server, and content server are isolated from each other. It is understandable that an independent server is not responsible for performing every function, and these servers can be logically or physically integrated according to their roles. For example, an SG server and a presentation server can be integrated into a mobile multimedia presentation system.

The implementation of this embodiment is omitted as it is similar to the previous embodiment.

In this embodiment, data is presented on a terminal by utilizing local terminal capabilities, defining unified UIs, and using the data obtained from the server. A UI must be customized and special client software based on terminal capabilities must be developed before this solution is implemented.

Specifically, the main process of this embodiment is similar to the previous embodiment. The differences lie in functions and structure of terminal.

In this embodiment, the terminal is required to play media content, which may be obtained from a server, a local terminal, or a CLIP from server, and finish playing in a local destination.

Therefore, the terminal is divided into the following three layers: lower layer, adapted to: transfer SG and media content; intermediate adaptation layer for software; and application layer for multimedia presentation.

Terminal's processing method for SG data is similar to the previous embodiment. SG's application is reinforced on the bases of SG's playing function.

Terminal's mobile multimedia service presentation is completed by an application unit for multimedia presentation. While presenting SG, if certain media content of mobile multimedia service, for example, a video, needs to perform presentation, an application unit for multimedia presentation will call corresponding downloading engine and multimedia player to download and play related content, and then present the multimedia service.

Because the multimedia presentation application is implemented by local terminal's application, the GUI embedded in player or any other new GUI can be used for implementation.

The methods for obtaining SG and media content are not limited to this embodiment and can be implemented according to conditions.

C. The third category refers to implementing SG's functions for browsing, playing media content, and providing an interaction between a terminal and a server.

Figure 10A:
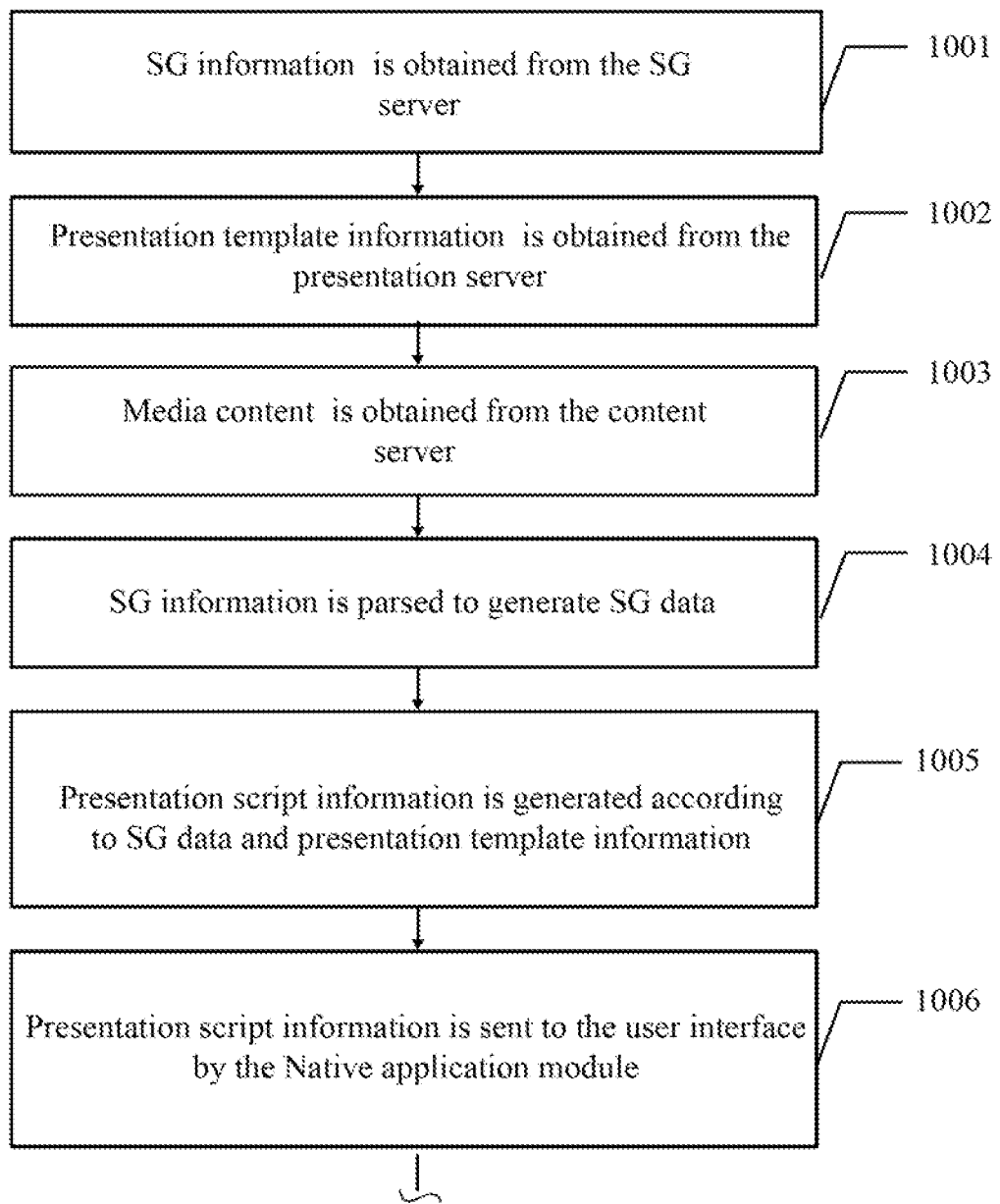
FIG. 10A-10B shows a first embodiment of media service presentation method in an embodiment of the present invention.
Figure 10B:
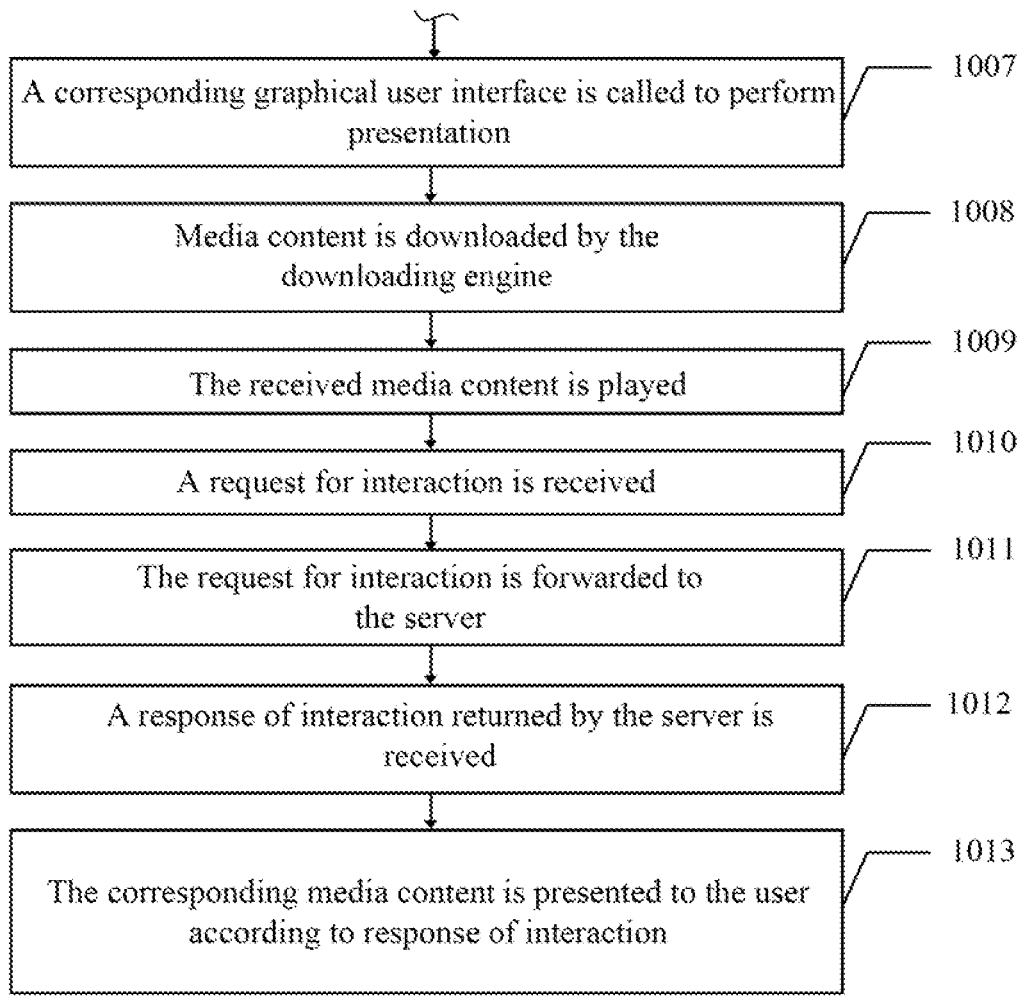

See FIG. 10A-10B. The fifth embodiment of media service presentation method in an embodiment of the present invention comprises:

Step 1001: SG information is obtained from an SG server.

In this embodiment, SG information is transmitted in two ways: broadcasting and interaction.

Searching the SG in broadcasting mode: A public address carrying an SG bootstrap session enables a terminal to find SG's access information from different operators. The terminal finds SG assert session according to this information and obtains SG transmission descriptors through an assert session. For example, a descriptor can find an entry address of FLUTE and further obtain the content of SG information.

Sending the SG in broadcasting mode: SG transmit unit performs the transfer within one or more FLUTE statements to transmit the SG by the broadcasting mode.

An interactive path can obtain complete SG information and also assist the terminal in searching and obtaining part of the required SG information.

The searching of interactive SG is divided into two ways:

1. Searching SG's entry information from an interactive network

A terminal user visits a known SG portal through an interactive network and chooses to visit and download favorite SG information.

2. Searching interactive SG's information through a broadcasting network

A terminal user receives a bootstrap session from the broadcast network. If the service navigation vendor provides an interactive SG, the terminal user obtains entry information relating to interactive SG through a bootstrap session, visits and downloads the SG through the portal.

Interactive SGs are transferred and obtained in the following way: The terminal sends a request for searching content to an SG server through HTTP Get or HTTP POST. After receiving the request, the SG vendor returns corresponding SG data in the load through HTTP response. The terminal can obtain all or part of the SG information through one interaction, including information relating to a channel or program.

Step 1002: Presentation template information is obtained from a presentation server.

In this embodiment, presentation template information is obtained from a presentation server. Therefore, it is understandable that presentation template information is preset in a terminal if no presentation server is installed.

The presentation server employs text or figures to illustrate the styles of presentation server. For instance, some digit numbers, such as '1', '2', or '3', are used to define a style for the local terminal.

Given a presentation server, presentation template information is obtained by the following ways:

Push mechanism;

content delivery mechanism includes dynamic content delivery (DCD);

internee protocols, such as HTTP; and message mechanisms, such as MMS, SMS or IM.

Step 1003: Media content is obtained from a content server.

In this embodiment, the media contained is obtained by a content server. Therefore, it is understandable that the content media is directly preset in a terminal without any content server in the practical application.

Step 1004: SG information is resolved to generate SG data. Further the received SG information is resolved to generate the SG data.

Step 1005: Presentation script information is generated according to SG data and presentation template information.

In this embodiment, the obtained SG data is filled into corresponding location according to rules relating to presentation template information to generate presentation script information, which is used to present the HTML.

In this embodiment, presentation template information can be either a rule file or any other files.

Step 1006: Presentation script information is sent to a user interface through the Native application module.

Step 1007: A corresponding GUI is called for presentation.

Step 1008: The media content is downloaded through a downloading engine.

Step 1009: The received media content is played.

Step 1010: A request for interaction is received. Further, a request for interaction from a user is received, for example, a request for slow motion.

Step 1011: The request for interaction is forwarded to the server. Further, a user's request for interaction is forwarded to a server.

Step 1012: An interaction response is received from the server. Through the interaction response and content-on-demand, a server can send the necessary content to a terminal.

Step 1013: The corresponding media content is presented to the user according to an interaction response.

In this embodiment, the SG server, presentation server, and content server are isolated from each other. It is understandable that an independent server is not responsible for performing every function, and these servers can be logically or physically integrated according to their roles, for example, an SG server and a presentation server can be integrated into a mobile multimedia presentation system.

The implementation of this embodiment is omitted as it is similar to the previous embodiment.

In this embodiment, data is presented on a terminal by utilizing local terminal capabilities, defining unified UIs, and using the data obtained from the server. A UI must be customized and special client software based on terminal capabilities must be developed before this solution is implemented.

An application unit, which is responsible for interaction, is used in this embodiment. This unit is always ready for interaction during mobile multimedia service presentation. Once triggered, this unit calls lower-layer technologies, such as Http, RTP/RTCP, SMS, MMS, and IM, to communicate with the server and complete related interaction.

The methods for obtaining SG and media content are not limited to this embodiment and can be implemented according to conditions.

Through the embodiments described earlier, it is apparent for those skilled in the art to implement this invention through a combination of software and hardware, or hardware alone. Based on such understanding, the solution specified in the present invention describes all or part of the software which has contributed to the technologies discussed in the BACKGROUND section. The software products range from ROM/RAM, disks to optical disks, and can be stored in storage media. These products enable a computer, such a personal computer, a server or network device, to implement each embodiment or methods provided in any embodiment of the present invention.

The preceding embodiments are provided in the present invention. It is apparent that those skilled in the art can make various improvements and modifications to the invention without departing from the principles of the invention. The present invention shall cover these improvements and modification.

What is claimed is:

1. A media service presentation method, comprising:
    obtaining media content, presentation template information, and service guide (SG) information from a server;
    generating a presentation script according to the presentation template information and the SG information; and
    presenting the media content to a user according to the presentation script,
    wherein generating the presentation script comprises:
        resolving the SG information to generate SG data; and
        converting the SG data into the presentation script according to the presentation template information.

2. The method according to claim 1, wherein obtaining the SG information comprises receiving an extensible markup language (XML) file that contains the SG information from an SG server through a FLUTE session in broadcasting mode.

3. The method according to claim 1, wherein the presentation script is derived from the presentation script file in a format of a player, and wherein presenting the media content to the user according to the presentation script comprises using the player to play the presentation script and presenting the media content to the user.

4. The method according to claim 3, wherein playing the presentation script is selected from the group consisting of:
    calling a video player to play the presentation script; and
    calling an embedded video player to play the presentation script.

5. The method according to claim 1, wherein obtaining the media content comprises:
    receiving a user's request for interaction;
    forwarding the request through a preset data transmission protocol to the server; and
    receiving the media content that is sent by the server on the basis of the user's request for interaction.

6. A communication system, comprising:
    a mobile multimedia presentation system configured to:
        obtain service guide (SG) information and presentation template information;
        generate a presentation script according to the presentation template information and the SG information; and deliver a presentation file that contains the presentation script; and
a terminal configured to:
receive the presentation script obtained from the presentation file in the mobile multimedia presentation system, and
present media content to a user according to the presentation script,
wherein the mobile multimedia presentation system is further configured to resolve the SG information to generate SG data and covert the SG data into the presentation script according to the presentation template information.

7. The communication system according to claim 6, further comprising a content server configured to deliver the media content to the terminal.

8. A terminal, comprising:
a receiver configured to receive media content, presentation template information, and service guide (SG) information from a server;
a processor configured to generate a presentation script according to the presentation template information and the SG information; and
a presentation unit configured to present the media content to a user of the terminal according to the presentation script generated by the processor,
wherein the processor is further configured to resolve the SG information to generate SG data and convert the SG data into the presentation script according to the presentation template information.

9. The terminal according to claim 8, further comprising a downloading engine configured to download the media content in response to a request from the user.

10. The terminal according to claim 8, further comprising a communication interface configured to deliver interactive information between the terminal and the server when the media content is being presented.

11. The terminal according to claim 8, wherein the presentation unit comprises:
a service player adapted to play the presentation script file for the user, wherein the presentation script file is in a format of a player; and/or
a browser adapted to play the presentation script file for the user, wherein the presentation script file is in a format of the browser.

12. The method according to claim 1, wherein obtaining the SG information comprises:
obtaining entry information relating to the SG information from an interactive network or a broadcast network;
requesting content of the SG server according to the entry information; and
receiving an extensible markup language (XML) file from the SG server, wherein the XML file contains the SG information.

13. The method according to claim 1, wherein obtaining the SG information comprises:
receiving an extensible markup language (XML) file that contains compressed SG information from the SG server through a FLUTE session in broadcasting mode; and
decompressing the compressed SG information to obtain the SG information.

14. The method according to claim 1, wherein obtaining the SG information comprises:
obtaining entry information relating to the SG information through an interactive network or a broadcast network;
requesting content of the SG server according to the entry information;

receiving an extensible markup language (XML) file that contains compressed SG information from the SG server; and
decompressing the compressed SG information to obtain the SG information.

15. The method according to claim 1, wherein the presentation script is derived from the presentation script file in a format of a browser, and wherein presenting the media content to the user according to the presentation script comprises using the browser to play the presentation script and presenting the media content to the user.

16. The method according to claim 15, wherein playing the presentation script is selected from the group consisting of:
calling a video player to play the presentation script; and
calling an embedded video player to play the presentation script.

17. The method according to claim 15, wherein playing the presentation script comprises:
sending the presentation script to a user interface through a Native application module; and
calling a corresponding graphical user interface to present the presentation script file on the user interface.

18. The method according to claim 3, wherein playing the presentation script comprises:
sending the presentation script to a user interface through a Native application module; and
calling a corresponding graphical user interface to present the presentation script file on the user interface.

19. The method according to claim 1, wherein obtaining the media content comprises:
receiving a request for interaction from a terminal;
activating and editing corresponding interaction information according to the request for interaction;
sending the edited interaction information to the server; and
receiving the media content that is sent by the server on the basis of the user's request for interaction.

20. The communication system according to claim 6, wherein the presentation file is transferred in a way that is selected from the group consisting of a stream protocol, a download protocol, a PUSH mechanism, a dynamic content delivery mechanism, and a real-time communication mechanism.

21. A communication system, comprising:
a mobile multimedia presentation system configured to deliver an extensible markup language file that contains service guide (SG) information and presentation template information; and
a terminal configured to:
generate a presentation script according to the presentation template information from a presentation server and the SG information from an SG server;
present media content to a user according to the presentation script;
resolve the SG information to generate SG data; and
convert the SG data into the presentation script according to the presentation template information.

22. The communication system according to claim 21, further comprising a content server configured to deliver media content to the terminal.

23. The method according to claim 1, further comprising presenting the SG information to the user.

24. The method according to claim 1, further comprising communicating with a server according to the preset data transmission protocol.

25. The terminal according to claim 8, further comprising an application unit for multimedia presentation that is adapted to present the SG information to the user.

26. The terminal according to claim 8, further comprising a network communication unit that is adapted to communicate with a server according to the preset data transmission protocol.

\* \* \* \* \*

UNITED STATES PATENT AND TRADEMARK OFFICE
CERTIFICATE OF CORRECTION

| | | |
|---|---|---|
| PATENT NO. | : 9,277,181 B2 | Page 1 of 1 |
| APPLICATION NO. | : 12/647360 | |
| DATED | : March 1, 2016 | |
| INVENTOR(S) | : Jian Yang et al. | |

It is certified that error appears in the above-identified patent and that said Letters Patent is hereby corrected as shown below:

Column 16, line 61-Column 17, line 13, Claim 6, should read:

A communication system, comprising:
a mobile multimedia presentation system configured to:
obtain service guide (SG) information and presentation template information;
generate a presentation script according to the presentation template information and the SG information; and
deliver a presentation file that contains the presentation script; and
a terminal configured to:
receive the presentation script obtained from the presentation file in the mobile multimedia presentation system, and
present media content to a user according to the presentation script,
wherein the mobile multimedia presentation system is further configured to resolve the SG information to generate SG data and convert the SG data into the presentation script according to the presentation template information.

Signed and Sealed this
Seventh Day of June, 2016

Michelle K. Lee
*Director of the United States Patent and Trademark Office*